United States Patent [19]

Simone

[11] 3,899,667

[45] Aug. 12, 1975

[54] SERIAL THREE POINT DISCRETE FOURIER TRANSFORM APPARATUS

[75] Inventor: Joseph D. Simone, Chelmsford, Mass.

[73] Assignee: Raytheon Company, Lexington, Mass.

[22] Filed: Dec. 26, 1972

[21] Appl. No.: 318,346

[52] U.S. Cl. .............................................. 235/156

[51] Int. Cl. .............................................. G06f 15/34

[58] Field of Search ........... 235/156, 181; 324/77 B, 324/77 D, 77 H

[56] References Cited

UNITED STATES PATENTS

| | | | |
|---|---|---|---|
| 3,673,399 | 6/1972 | Hancke | 235/156 |
| 3,704,826 | 12/1972 | Constantin | 235/156 |
| 3,721,812 | 3/1973 | Schmidt | 235/156 |
| 3,754,128 | 8/1973 | Corinthios | 235/156 |
| 3,783,258 | 1/1974 | Chwastyk | 235/156 |

OTHER PUBLICATIONS

C. M. Rader, "Discrete Fourier Transforms when the Number of Data Samples is Prime," Proceedings Letters, pp. 1107–1108, June 1968.

H. L. Groginsky, "A Pipeline Fast Fourier Transform," IEEE Trans. on Computers, Vol. C-19, No. 11, Nov. 1970 pp. 1015–1019.

*Primary Examiner*—David H. Malzahn
*Attorney, Agent, or Firm*—Richard M. Sharkansky; Philip J. McFarland; Joseph D. Pannone

[57] ABSTRACT

Serial three point discrete fourier transform apparatus is disclosed. The apparatus includes a summing circuit, a differencing circuit and a pair of storing means. A first digital sample is combined with a second succeeding digital sample in the summing and differencing circuits. The combined signals are stored in different ones of the pair of storage means. A third succeeding digital sample is combined in the summing circuit with the stored sum signal to produce a signal representative of one of the terms in the Fourier transform, and in the differencing circuit to produce an intermediate signal. The intermediate signal is stored in one of the pair of storage means and combined with the stored difference signal in the summing and differencing circuits to produce signals representative of the second and third terms of the Fourier transform.

2 Claims, 5 Drawing Figures

| c.p. | INPUT | a | b | c | d | e | f | g | ROM 73 | ROM 86 |
|---|---|---|---|---|---|---|---|---|---|---|
| 1 | f(0) | 0 | 1 | 0 | 0 | 1 | 1 | 0 | 1.0 | – |
| 2 | f(1) | 1 | 0 | 0 | 1 | 0 | 0 | 1 | 1.0 | – |
| 3 | f(2) | 0 | 0 | 1 | 1 | 0 | 1 | 0 | 0.5 | $\omega^0$ |
| 4 | f'(0) | 0 | 1 | 0 | 0 | 1 | 1 | 0 | 1.0 | $\omega^{+2}$ |
| 5 | f'(1) | 1 | 0 | 0 | 1 | 0 | 0 | 1 | 1.0 | $\omega^{+1}$ |
| 6 | f'(2) | 0 | 0 | 1 | 1 | 0 | 1 | 0 | 0.5 | $\omega^0$ |

| c.p. | INPUT | a | b | c | d | e | f | g | ROM 73 |
|---|---|---|---|---|---|---|---|---|---|
| 1 | f(0) | 0 | 1 | 0 | 0 | 1 | 1 | 0 | 1.0 |
| 2 | f(1) | 0 | 1 | 0 | 0 | 1 | 1 | 0 | 1.0 |
| ⋮ | ⋮ | ⋮ | ⋮ | ⋮ | ⋮ | ⋮ | ⋮ | ⋮ | ⋮ |
| 16 | f(16) | 0 | 1 | 0 | 0 | 1 | 1 | 0 | 1.0 |
| 17 | f(17) | 1 | 0 | 0 | 1 | 0 | 0 | 1 | 1.0 |
| ⋮ | ⋮ | ⋮ | ⋮ | ⋮ | ⋮ | ⋮ | ⋮ | ⋮ | ⋮ |
| 32 | f(32) | 1 | 0 | 0 | 1 | 0 | 0 | 1 | 1.0 |
| 33 | f(33) | 0 | 0 | 1 | 1 | 0 | 1 | 0 | 0.5 |
| ⋮ | ⋮ | ⋮ | ⋮ | ⋮ | ⋮ | ⋮ | ⋮ | ⋮ | ⋮ |
| 48 | f(48) | 0 | 0 | 1 | 1 | 0 | 1 | 0 | 0.5 |
| 49 | f(49) | 0 | 1 | 0 | 0 | 1 | 1 | 0 | 1.0 |
| ⋮ | ⋮ | ⋮ | ⋮ | ⋮ | ⋮ | ⋮ | ⋮ | ⋮ | ⋮ |
| 64 | f(64) | 0 | 1 | 0 | 0 | 1 | 1 | 0 | 1.0 |
| 65 | f(65) | 1 | 0 | 0 | 1 | 0 | 0 | 1 | 1.0 |
| ⋮ | ⋮ | ⋮ | ⋮ | ⋮ | ⋮ | ⋮ | ⋮ | ⋮ | ⋮ |
| 80 | f(80) | 1 | 0 | 0 | 1 | 0 | 0 | 1 | 1.0 |
| 81 | f(81) | 0 | 0 | 1 | 1 | 0 | 1 | 0 | 0.5 |
| ⋮ | ⋮ | ⋮ | ⋮ | ⋮ | ⋮ | ⋮ | ⋮ | ⋮ | ⋮ |
| 96 | f(96) | 0 | 0 | 1 | 1 | 0 | 1 | 0 | 0.5 |

SERIAL THREE POINT DISCRETE FOURIER TRANSFORM APPARATUS

BACKGROUND OF THE INVENTION

This invention relates generally to digital data processing apparatus and more particularly to apparatus which is adapted to produce the discrete Fourier transform of a complex waveform.

It is known in the art that the frequency spectrum of an electrical signal may be derived by application of the Fourier transform to the signal. There have been many different types of apparatus developed for this purpose. For example, apparatus adapted to derive the Fourier transform of a signal by processing, in a pipeline or serial manner, a time series of N complex numbers (i.e. an N point FFT processor) is shown in detail in U.S. Pat. No. 3,686,490, "Real Time Serial Fourier Transform" by Bertram J. Goldstone, issued Aug. 22, 1972 and assigned to the same assignee as the present invention.

It is also known in the art that an N point FFT processor may be formed by cascading an A point FFT processor and a B point FFT processor where $A \cdot B = N$. When a prime factor algorithm is selected for implementation, that is when A and B are mutually prime numbers, no intervening phase shifters (or "twiddle factors") are required between the cascaded stages as discussed in an article entitled "Historical Notes on the Fast Fourier Transform" by J. W. Cooley, P. A. W. Lewis and P. D. Welch published in the IEEE Transactions on Audio and Electroacoustics, Vol. AU-15, No. 2, June, 1967. Therefore, implementation of such prime factor algorithm by cascading a pair of mutually prime FFT processors would not require interstage (or inter-processor) multipliers.

It is further known that a serial integer ($r$) power of 2 (i.e. $2^r$) point FFT processor generally requires a minimum of $2^{r-1}$ storage stages. It is also known that to minimize the number of required multipliers through implementation of the prime factor algorithm, a serial ($n$) 3 point FFT processor is sometimes cascaded with a serial $2^r$ point FFT processor.

In many applications, such as in the processing of radar information, it is highly desirable to minimize the complexity and storage capacity of the processing apparatus.

SUMMARY OF THE INVENTION

With this background of the invention in mind it is therefore an object of this invention to minimize the required storage capacity in a serial 3 point FFT processor.

It is another object of the invention to provide a 3 point FFT processor adapted to mechanize a prime factor algorithm, such processor requiring minimum storage capacity.

These and other objects of the invention are attained generally by providing, in a serial 3 point FFT processor, commutator means having an input coupled to a source of complex digital samples and a pair of outputs and an arithmetic unit having a summing circuit and a differencing circuit, one of the pair of output terminals being coupled directly to the summing and differencing circuits and the other one of the pair of outputs being coupled to such circuits through a storage means. The output of the summing circuit is coupled to a second input of the commutating means and the output of the differencing circuit is coupled to a third input of the commutating means through a second storage means. A controller produces enabling signals to the commutator means whereby selected ones of the commutator means inputs are coupled to predetermined ones of the pair of outputs.

BREIF DESCRIPTION BRIEF THE DRAWINGS

For a more complete understanding of this invention reference is now made to the following description of the drawings in which.

DESCRIPTION OF THE PREFERRED EMBODIMENTS

Figure 1:
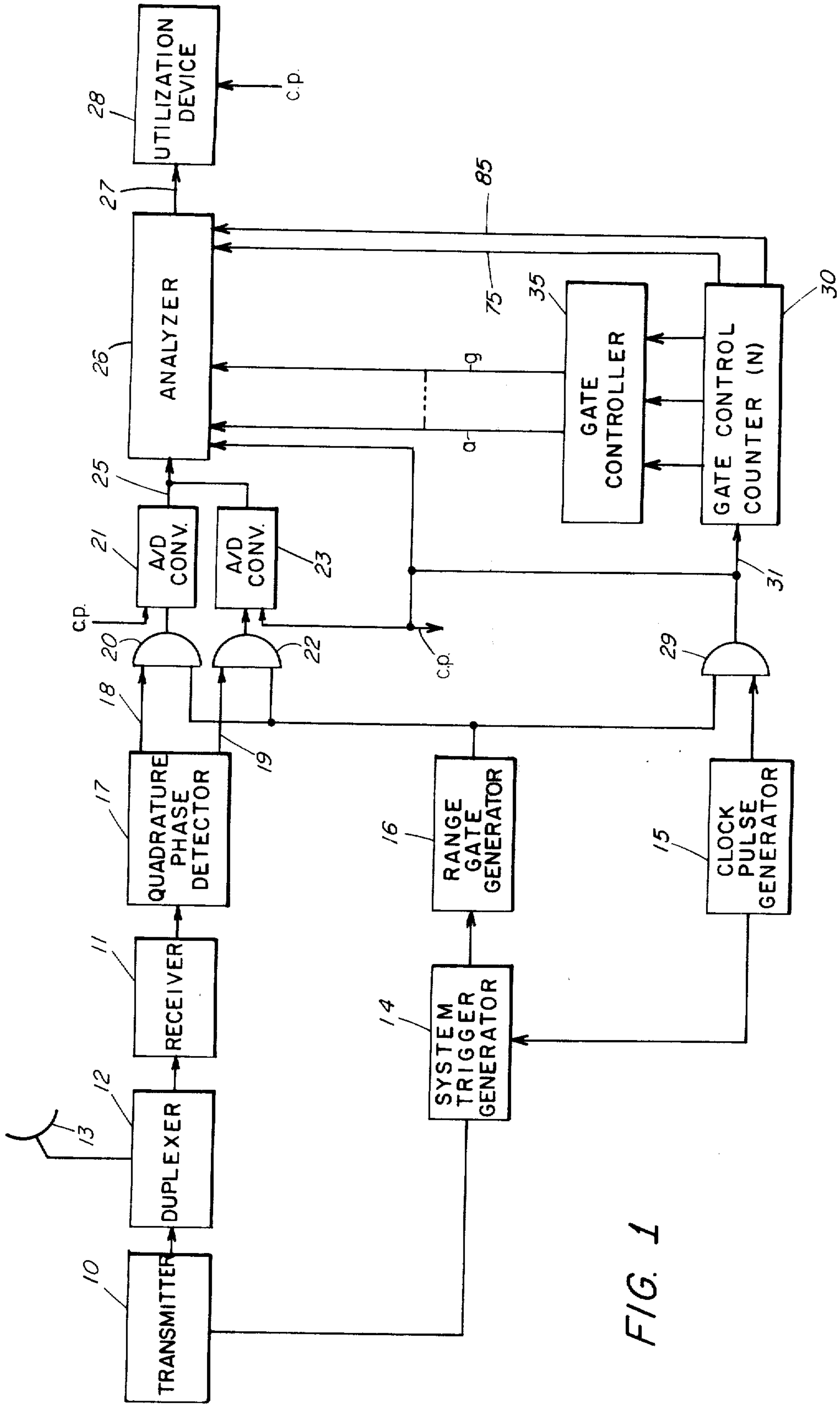
FIG. 1 is a block diagram, somewhat simplified, of a radar incorporating the transformation circuitry of this invention.

Referring now to FIG. 1, it may be seen that an exemplary pulse radar according to this invention includes a conventional transmitter 10 and receiver 11 operating through a duplexer 12 and an antenna 13 periodically to produce interrogating pulses of electromagnetic energy and echo signals corresponding to targets (not shown) illuminated by each one of such pulses. The operation of the transmitter 10 is controlled by a system trigger generator 14 of conventional construction. Operation of the system trigger generator 14 is synchronized with a clock pulse generator 15 as indicated. The latter, for example, may be a conventional crystal controlled free running pulse generator. The only restriction on the clock pulse generator 15 is that it produces output signals at substantially constant intervals at a rate corresponding to a sampling rate desired for received signals. A range gate generator 16, which also may be of conventional construction, is actuated as shown in response to each system trigger out of the system trigger generator 14 to produce a delayed gating signal during each range sweep. The output of the receiver 11 is fed to a conventional quadrature phase detector 17 which element in turn produces an " in phase" signal on line 18 and an "out of phase" signal on line 19. The former signal will be sometimes referred to hereinafter as the "real" portion of the signal and the latter will be referred to as the "imaginary" portion of the signal. The signal on line 18 is fed through an AND gate 20 to an analog-to-digital converter 21 (referred to hereinafter as A/D converter 21) while the signal on line 19 is fed through an AND gate 22 to analog-to-digital converter 23 (hereinafter referred to as A/D converter 23). A/D converter 21 and A/D converter 23 are preferably of conventional construction, each producing parallel digital words representative of the amplitude of each sampled real and imaginary portion of the signals out of the quadrature phase detector 17. Each corresponding "real" and "imaginary" word (which together describe each sampled portion of the waveform to be analyzed) is combined on line 25 and passed as a complex word to an analyzer 26. It is noted here that, for simplicity of illustration and description, the parallel digital words on the line 25 will be treated as single bits. That is, the multiplexing of the line 25 and the circuits which process and use the parallel digital words will not be shown or described, it being deemed obvious to a person of skill in the art that multiplexing of lines and circuits is required to process parallel digital words. The details of the analyzer 26 will be described hereinafter in connection with FIGS. 2 and 2A. Suffice to say here that the analyzer 26 processes the signals on line 25 so that the signals appearing on line 27 are the Fourier transform desired. The signals on line 27 are fed into a utilization device 28. The utilization device 28 may take any one of several forms. For example, if the system is to be used as a Doppler radar, the utilization device could include a conventional digital-to-analog converter and a cathode ray tube display to permit distinguishing between the Doppler shift characteristics of stationary and moving targets and providing a display of moving targets if desired.

The signal out of the range gate generator 16 enables an AND gate 29, thereby permitting pulses out of the clock pulse generator to pass to a gate control counter 30 and, via line 31, to the various elements which in the drawings receive a "c.p." input. The gate control counter 30 may be a conventional binary counter, the number of stages being equal to the batch size, (here 3), which provides signals to analyzer 26 in a manner to be described. The gate controller 35 preferably is a conventional diode matrix which provides enabling signals on the lines labeled *a* through *g* for reasons which will become clear hereinafter.

Figures 2, 2A:
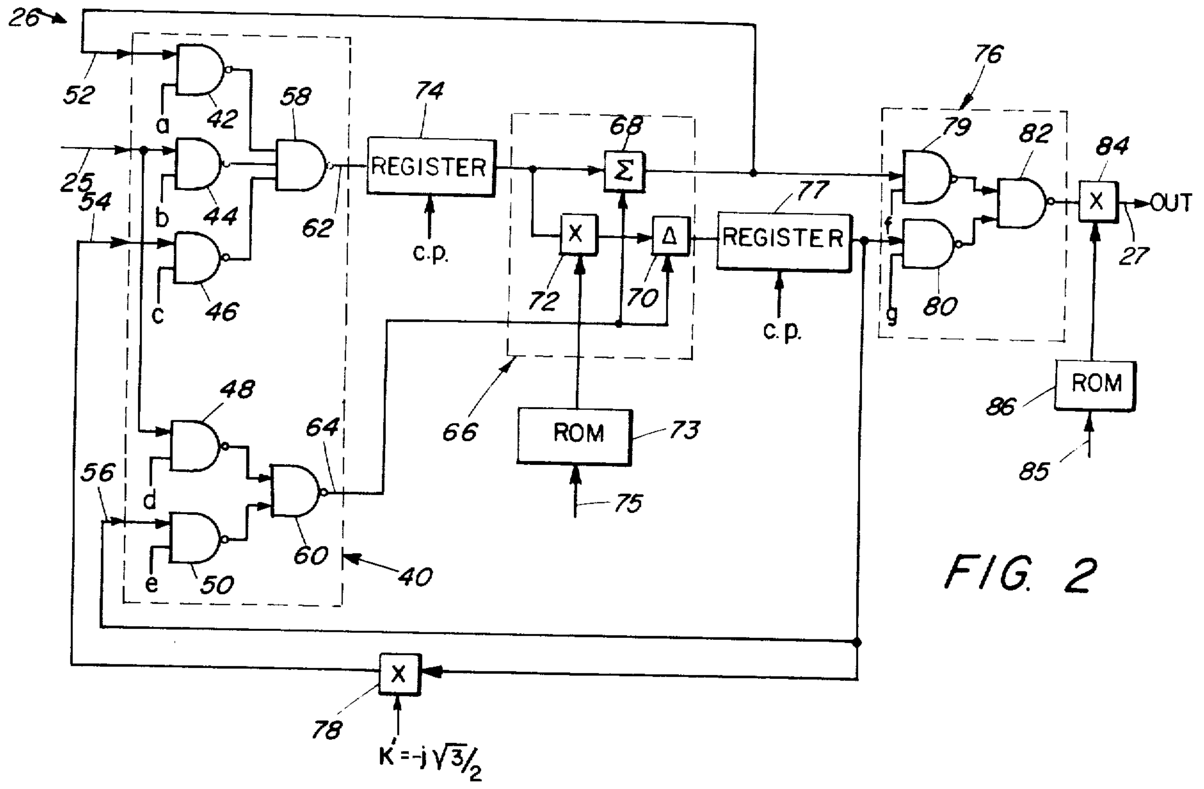
FIG. 2 is a block diagram showing an analyzer according to this invention.
FIG. 2A is a table outlining the time sequence of the operation of logic circuits used in the analyzer shown in FIG. 2.

Referring now to FIGS. 2 and 2A, the constitution and operation of the analyzer 26 may be seen. It should be noted that the structure illustrated has been selected to demonstrate the processing of a batch of N, here 3, digital samples. As such, the structure performs a 3 point FFT on the samples. Such 3 point FFT may be described as one which operates on a batch of three successive digital samples according to the following equation:

$$\text{Eq. (1)}\quad F(K) = \sum_{n=0}^{2} f(n)\,\omega^{-Kn} \qquad K = 0,1,2$$

where $$\omega = e^{j\,2\pi/3};$$

$$j = \sqrt{-1};$$

$f(n)$ = value of the nth digital sample; and $F(K)$ = the Kth term in the Fourier transform.

As noted hereinbefore, each sample is a parallel digital number having a "real" portion and an "imaginary" portion. Each such number describes a different one of the samples of the waveforms to be transformed, the precision of description being dependent on the number of bits used. The complex digital words on line 25 are led to a commutator means 40. Such commutator means 40 includes NAND gates 42–50, such gates being connected to inputs 52, 25, 54, 25, 56, respectively, as shown. NAND gates 42–50 are connected to enabling lines a - e, respectively, as shown. The enabling signal on each one of such lines is supplied by gate controller 35 (FIG. 1). The outputs of NAND gates 42–46 serve as inputs for NAND gate 58. The outputs of NAND gates 48 and 50 serve as inputs for NAND gate 60. The outputs of NAND gates 58 and 60 provide a pair of outputs 62, 64. An arithmetic unit 66 includes a summing circuit 68, a differencing circuit 70 and a muliplier 72. The summing circuit 68 has one of its inputs connected to output 62 through a shift register 74 and the other one of its inputs connected directly to the output 64. The differencing circuit 70 has one of its inputs connected directly to the output 64 and the other one of its inputs connected to output 62 through both shift register 74 and multiplier 72, as shown. Multiplier 72 multiplies the signal out of shift register 74 by a signal produced by a read only memory 73 in a manner to be described. Shift register 74 is of conventional design here having one stage of storage with an additional characteristic that data is written into such stage in response to the trailing edge of the clock pulse c.p. applied thereto. The output of summing circuit 68 is connected to NAND gate 42 and to NAND gate 79. The output of differencing circuit 70 is connected to a shift register 77, here of identical construction as shift register 74, and to NAND gate 80. The output of shift register 77 is also connected to NAND gate 50 and NAND gate 46 through a complex multiplier 78. Complex multiplier 78 multiplies the signal produced by shift register 77 by a factor K', here $K' = -j\sqrt{3/2}$, where $j = \sqrt{-1}$. NAND gates 79, 80 are connected to enabling lines f and g, respectively, as shown. The outputs of NAND gates 79 and 80 feed NAND gate 82. NAND gates 79, 80 and 82 comprise commutator means 76. The output of NAND gate 82 is connected to a complex multiplier 84. Complex multiplier 84 multiplies the signal passing through NAND gate 82 by a signal produced by a read only memory (ROM) 86 in a manner to be described.

The operation of the analyzer 26 will now be discussed with additional reference to FIG. 2A. During the 1st clock pulse the first sample f(0) is gated through NAND gates 44 and 58 (such gate 44 being enabled by the signal on line "*b*") and, in response to the trailing edge of such clock pulse f(0), becomes stored in shift register 74. During the 2nd clock pulse the second sample $f(1)$ is gated through NAND gates 48 and 60 (such gate 48 being enabled by the signal on line "*d*") and is applied to the summing circuit 68 and the differencing circuit 70. The first sample, f(0), which is stored in shift register 74 is also applied to the summing circuit 68 and the differencing circuit 70. During the 2nd clock pulse read only memory (ROM) 73 produces, in response to a signal on line 75 from gate control 35 (FIG. 1) a signal representative of 1.0. Therefore, the summing circuit 68 produces the quantity $f(0) + f(1) = B$ and the differencing circuit 70 produces the quantity $-f(0) + f(1) = A$.

In response to the trailing edge of the 2nd clock pulse the quantity B is gated through NAND gates 42 and 58 (such gate 42 being enabled by the signal on line "*a*") and is stored in shift register 74. Likewise, the quantity A is stored in shift register 77. During the 3rd clock pulse a third sample $f(2)$ is gated through NAND gates 48 and 60 (such gate 48 being enabled by a signal on line "*d*") and $f(2)$ is therefore applied to summing circuit 68 and differencing circuit 70. The signal stored in shift register 74 (i.e. (B)) is coupled to summing circuit 68 and differencing circuit 70. However, during the 3rd clock pulse the read only memory (ROM) 73 produces, in response to a signal on line 75 from gate control 35, a signal representative of 0.5. Therefore, the signal coupled to differencing network from shift register 74 is 0.5B. It follows then that the signal produced at the output of summing circuit 68 is $B + f(2) = F_o$ and the signal produced at the output of differencing circuit 70 is $-.5B + f(2) = C$. Further, during the 3rd clock pulse the signal $F_o$ is gated through NAND gates 79 and 82, (such gate 79 being enabled by the signal on line "$f$"). The signal $F_o$ is the phase uncorrected signal representing the first term of the discrete Fourier transform of the signal on line 25. Such signal may be applied directly to utilization device 28 (FIG. 1) if such device uses the magnitude of the complex data such as with a cathode ray tube display or threshold detection circuity. However, in order to correct the phase of such signal, a complex multiplier 84 is provided as shown. Such complex multiplier 84 is connected to a read only memory 86. During the 3rd clock pulse the read only memory 86 produces, in response to a signal on line 85 from gate control counter 35, a signal representative of $\omega^o = 1.0$. Therefore, the signal produced at the output of complex multiplier 84 represents F(0) (the first Fourier term) according to Eq. (1). Further, in response to the trailing edge of the 3rd clock pulse the signal C becomes stored in shift register 77 and the signal previously stored in shift register 77 (i.e. A) is, after being multiplied by the factor K' in complex multiplier 78, passed through NAND gates 46 and 58 (such gate 46 being enabled by the "$c$" signal) and stored in shift register 74. During the 4th clock pulse a fourth sample f'(0) is applied to commutator means 40. Such signal f'(0) is the first sample in a second set of three samples. Further, the signal stored in shift register 74 (i.e. AK') and the signal stored in shift register 77 (i.e. C) are applied to the summing circuit 68 and differencing circuit 70. It is noted that the signal stored in shift register 77 (i.e. C) passes through NAND gates 50 (because of the "$e$" enabling signal). During the 4th clock pulse the read only memory 73 produces a signal representative of 1.0 in response to the signal on line 75. Therefore, the signal produced at the output of summing circuit 68 is $AK' + C = F_2$ and the signal produced at the output of differencing circuit 70 is $-AK' + C = F_1$. (It is noted that the signals $F_2$ and $F_1$ are phase uncorrected Fourier terms.) Because of the enabling signal on line f the signal $F_2$ is gated through NAND gates 79 and 82 to complex multiplier 84. Further, during the 4th clock pulse the read only memory 86 produces a signal representative of $\omega^2 = e^{j4\pi/3}$, in response to the signal on line 85, and the signal at the output of complex multiplier 84 may therefore be represented $F(2) = \omega^2 F_2$, the 3rd Fourier term. In response to the trailing edge of the 4th clock pulse the fourth sample f'(0) passes through NAND gates 44 and 58 (such gate 44 being enabled by the signal on line "$b$") and is stored in shift register 74. Likewise, the signal at the output of the differencing circuit 70 (i.e. C) becomes stored in shift register 77. During the 5th clock pulse the signal stored in the shift register 77 (i.e. $F_1$) passes through NAND gates 80 and 82 (such gate 80 being enabled by the signal on line g). During the 5th clock pulse the read only memory 86 produces a signal representative of $\omega^1 = e^{j2\pi/3}$.

Therefore the signal out of such complex multiplier is $F(1) = \omega^1 F_1$, the 2nd Fourier term. Further, the signals applied to the arithmetic unit 66 are f'(0) and the fifth sample $f'(1)$ (i.e. the second sample in the second set of three samples) a condition analogous to that existing at the time of the 2nd clock pulse. The operation described above continues in like manner for succeeding samples to produce on succeeding batchs of 3 samples, a 3 point FFT as defined by Eq. (1).

Figures 3, 3A:
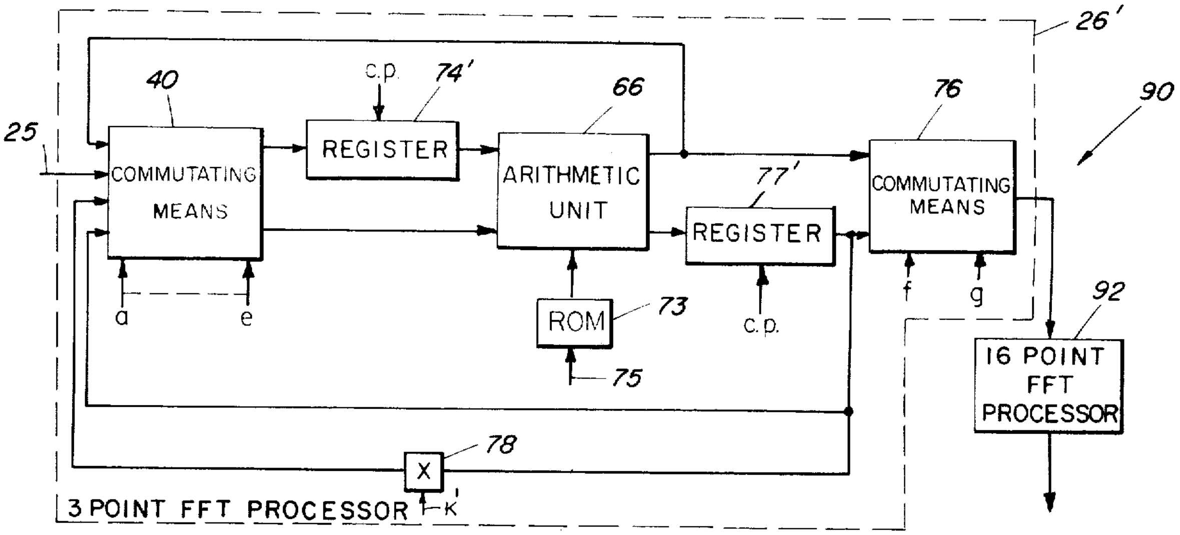
FIG. 3 is a block diagram showing an alternate embodiment of the analyzer according to the invention; and, FIG. 3A is a table outlining the time sequence of the operation of logic circuits used in the analyzer shown in FIG. 3.

Referring now to FIG. 3, a 48 point FFT processor 90 is shown. Such processor is formed by cascading a 3 point FFT processor 26' and a 16 point FFT processor 92, as shown. Such processor 90 is an implementation of a prime factor algorithm because 3 and 16 are mutually prime numbers. Therefore, such implementation does not require a multiplier, or phase adjustment mechanism, intermediate the 3 point FFT processor 26' and the 16 point FFT processor 92. The processor 90 may be used as the analyzer 26 in FIG. 1 with appropriate modification of the gate control counter 30 and the gate controller 35, such modification becoming evident hereinafter. Processor 26' is similar in construction to the analyzer 26 (FIG. 2). Therefore, such processor 26' includes commutating means 40; arithmetic unit 66; and commutating means 76 arranged as shown in FIG. 2. Shift registers 74' and 77' here, however, each include 16 storage stages. The 16 point FFT processor 92 may be any conventional serial 16 point FFT processor; here the processor is the one described in the referenced U.S. Pat. No. 3,686,490 assigned to the same assignee as the present invention.

Referring now to FIG. 3A it may be seen that the operation of processor 26' is analogous to the operation of analyzer 26 in that each batch of 16 samples applied to such processor 26' is processed in a similar manner as each sample in analyzer 26. It follows then that after the 32nd clock pulse the signal produced at the output of processor 26' may be operated upon by processor 92. That is, processor 92 may be operated in the manner described in the referenced U.S. Pat. No. 3,686,490 commencing at the time of the 32nd clock pulse. Therefore, a little thought will make it apparent that the phase uncorrected Fourier coefficients $F_o$ to $F_{47}$ will appear at the output of processor 90 starting with the 49th clock pulse.

If phase correction is required for the signals out of 16 point FFT processor 92, a read only memory and complex multiplier (not shown) may be arranged as shown for read only memory 86 and complex multiplier 84 in FIG. 2. Here, however, the read only memory (not shown) would produce a signal representative of: $\omega^o = 1$ from the 49th clock pulse to the 64th clock pulse; $\omega^2$ from the 65th clock pulse to the 80th clock pulse; and, $\omega^1$ from the 81st clock pulse to the 96th clock pulse.

Having described various embodiments of this invention, it will now become apparent to those of skill in the art that changes may be made in such embodiments without departing from the inventive concepts described herein. For example, complex multiplier 78 may be disposed at the output of the differencing circuit with appropriate adjustment to the factor K'. Further, the apparatus may be adapted to perform the inverse discrete Fourier transform of a signal. Still further, it is evident that although this invention has been illustrated as a portion of a radar system, the analyzer itself may be used in any circuit as a spectrum analyzer to determine the frequency content of complex time-varying signals.

It is felt therefore that this invention should not be restricted to the proposed embodiments, but rather should be limited only by the spirit and scope of the following claims.

What is claimed is:

1. Digital data processing apparatus comprising:

commutating means having a plurality of inputs, one thereof being coupled to a source of digital samples;

an arithmetic unit having a pair of outputs, a first one thereof being coupled to one of the plurality of inputs;

a pair of storage means, a first one thereof being coupled between the commutating means and the arithmetic unit and a second one thereof being coupled between a second one of the pair of outputs and one of the plurality of inputs, and, wherein the arithmetic unit includes:

a summing circuit coupled between the first one of the pair of storage means and the first one of the pair of outputs; and a differencing circuit coupled between the first one of the pair of storage means and the second one of the pair of storage means.

2. The apparatus recited in claim 1 including additionally a multiplier couped between the differencing circuit and one of the plurality of inputs of the commutating means.

* * * * *